(12) United States Patent
Piispanen et al.

(10) Patent No.: US 11,394,265 B2
(45) Date of Patent: Jul. 19, 2022

(54) ELECTRIC MACHINE ELEMENT AND AN ELECTRIC MACHINE

(71) Applicant: Danfoss Editron OY, Lappeenranta (FI)

(72) Inventors: Mikko Piispanen, Lappeenranta (FI); Mika Bjorkholm, Lappeenranta (FI); Juha Toikka, Lappeenranta (FI); Tapani Siivo, Lappeenranta (FI)

(73) Assignee: Danfoss Editron OY, Lappeenranta (FI)

( * ) Notice: Subject to any disclaimer, the term of this patent is extended or adjusted under 35 U.S.C. 154(b) by 193 days.

(21) Appl. No.: 16/838,195

(22) Filed: Apr. 2, 2020

(65) Prior Publication Data

US 2020/0328645 A1  Oct. 15, 2020

(30) Foreign Application Priority Data

Apr. 11, 2019 (EP) .................................... 19168692

(51) Int. Cl.
*H02K 3/28* (2006.01)
*H02K 1/16* (2006.01)
(Continued)

(52) U.S. Cl.
CPC .................. *H02K 3/28* (2013.01); *H02K 1/16* (2013.01); *H02K 1/2706* (2013.01); *H02K 3/12* (2013.01); *H02K 3/48* (2013.01); *H02K 21/10* (2013.01)

(58) Field of Classification Search
CPC .......... H02K 3/28; H02K 1/16; H02K 1/2706; H02K 3/12; H02K 3/48; H02K 21/10;
(Continued)

(56) References Cited

U.S. PATENT DOCUMENTS 8,736,216 B2   5/2014  Naik et al.
2012/0068657 A1   3/2012  Fulton et al.
(Continued)

FOREIGN PATENT DOCUMENTS

EP   2 624 444 A2   8/2013
EP   3 240 185 A1   11/2017
JP   2016-171607 A   9/2016

OTHER PUBLICATIONS

Extended European Search Report for European Patent Application No. 19168692.2 dated Sep. 13, 2019.
(Continued)

*Primary Examiner* — Ahmed Elnakib
(74) *Attorney, Agent, or Firm* — McCormick Paulding and Huber LLP

(57) ABSTRACT

An electric machine element comprises electric terminals (101) for connecting to an external AC system and a multiphase winding (102) comprising at least two multiphase winding portions (103, 104). Each multiphase winding portion comprises phase-windings (106a-106c, 107a-107c) each having a first end (109) and a second end (110). The multiphase winding portions are successively connected to constitute chains (113a-113c) of the phase-windings so that the first ends of the phase-windings of a first one (103) of the multiphase winding portions are connected to the electric terminals. Each multiphase winding portion comprises switches (114a, 114b, 115a, 115b) for connecting the second ends of the phase-windings of the multiphase winding portion to each other. Thus, the number of turns of the multiphase winding is changeable by selecting which one of the multiphase winding portions has a star-point at the second ends of its phase-windings.

16 Claims, 5 Drawing Sheets

(51) Int. Cl.
*H02K 1/2706* (2022.01)
*H02K 3/12* (2006.01)
*H02K 3/48* (2006.01)
*H02K 21/10* (2006.01)

(58) Field of Classification Search
CPC ............ H02K 1/165; H02K 3/50; H02K 1/27; H02K 21/14; H02P 25/18; H02P 25/16
USPC .................................................. 310/179–209
See application file for complete search history.

(56) References Cited

U.S. PATENT DOCUMENTS

| | | | | |
|---|---|---|---|---|
| 2013/0127391 | A1* | 5/2013 | Lewis ..................... | H02P 25/18 |
| | | | | 318/498 |
| 2013/0221791 | A1* | 8/2013 | Tomohara ................ | H02K 3/00 |
| | | | | 310/198 |
| 2017/0133968 | A1* | 5/2017 | Takahashi ................ | H02K 3/50 |

OTHER PUBLICATIONS

Communication pursuant to Article 94(3) EPC for European Patent Application No. 19168692.2 dated May 20, 2021.

\* cited by examiner

ELECTRIC MACHINE ELEMENT AND AN ELECTRIC MACHINE

CROSS-REFERENCE TO RELATED APPLICATION

This application claims foreign priority benefits under 35 U.S.C. § 119 to European Patent Application No. 19168692.2 filed on Apr. 11, 2019, the content of which is hereby incorporated by reference in its entirety.

TECHNICAL FIELD

The disclosure relates generally to electric machines. More particularly, the disclosure relates to an electric machine element that comprises at least one multiphase winding, e.g. a three-phase winding. The electric machine element can be for example a part of a stator of an electric machine or a part of a rotor of an electric machine. Furthermore, the disclosure relates to an electric machine.

BACKGROUND

In traditional design of permanent magnet machines, the nominal rotation speed of the permanent magnet machine cannot be safely exceeded by more than by about 40%. For example, if the nominal rotation speed is 2000 rounds per minute "rpm" it means that the maximum recommended speed would be around 2800 rpm. This limit is due to a linearly increasing back electromotive force "EMF" of a permanent magnet machine as a function of the rotation speed of the permanent magnet machine. In a fault situation, an alternating current "AC" system e.g. a converter connected to a permanent magnet machine is not necessarily able to suppress the back EMF of the permanent magnet machine. The unsuppressed back EMF during an overspeed and a fault situation of the kind mentioned above will lead to an overvoltage situation that may damage the permanent magnet machine and/or the AC system connected to the permanent magnet machine.

The above-mentioned technical problem is often solved by choosing a permanent magnet machine that has a higher nominal rotation speed that would be otherwise needed. This workaround however limits a maximum peak torque that can be reached with a given peak current. Therefore, an AC system e.g. a converter connected to a permanent magnet machine needs to be designed for a higher peak current. Also, an achievable steady-state torque that can be reached with a given steady-state current is decreased and therefore the AC system needs to be designed for a higher steady-state current, too.

Variable speed drives implemented with an induction machine have their own challenges related to a selection of the nominal rotation speed of an induction machine. In conjunction with an induction machine, the nominal rotation speed is a speed that is achievable with the nominal stator voltage without field weakening i.e. without decreasing the breakdown torque of the induction machine. The higher is the above-mentioned nominal rotation speed, the higher is the stator current that is needed for generating a required torque with a given magnetic flux, e.g. the nominal magnetic flux, of the induction machine.

SUMMARY

The following presents a simplified summary in order to provide a basic understanding of some aspects of various embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments.

In accordance with the invention, there is provided a new electric machine element for an electric machine. The electric machine element can be for example a part of a stator or a part of a rotor of an electric machine. An electric machine element according to the invention comprises:

electric terminals for connecting to an alternating current system external to the electric machine element, and
  at least one multiphase winding connected to the electric terminals and comprising at least two multiphase winding portions each comprising phase-windings each having a first end and a second end.

The multiphase winding portions are successively connected to each other so that each phase of the multiphase winding is a chain of the phase-windings belonging to the phase under consideration so that an electric current path from the second end of each phase-winding belonging to the phase under consideration to one of the electric terminals belonging to the phase under consideration comprises at least the phase-winding under consideration. Each of the multiphase winding portions comprises switches for connecting the second ends of the phase-windings of the multiphase winding portion under consideration to each other. Thus, each of the multiphase winding portions can be arranged to have a star-point at the second ends of the phase-windings of the multiphase winding portion under consideration.

The number of turns of the multiphase winding is changeable by selecting which one of the multiphase winding portions has a star-point at the second ends of its phase-windings. Thus, the nominal rotation speed of an electric machine comprising an electric machine element according to the invention can be changed by selecting which one of the multiphase winding portions has the star-point.

A machine element according to an exemplifying and non-limiting embodiment comprises two or more multiphase windings each of which is a multiphase winding of the kind described above. The machine element may comprise for example two three-phase windings having a physical phase-shift of 30 electrical degrees.

In accordance with the invention, there is provided also a new electric machine that comprises first and second machine elements rotatably supported with respect to each other, wherein the first machine element is an electric machine element according to the invention. The first machine element can be for example a part of the stator of the electric machine and the second machine element can be the rotor of the electric machine.

Various exemplifying and non-limiting embodiments are described in accompanied dependent claims.

Various exemplifying and non-limiting embodiments both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments and their advantages are explained in greater detail below in the sense of examples and with reference to the accompanying drawings, in which.

DETAILED DESCRIPTION

The specific examples provided in the description below should not be construed as limiting the scope and/or the applicability of the accompanied claims. Lists and groups of examples provided in the description are not exhaustive unless otherwise explicitly stated.

Figure 1A:
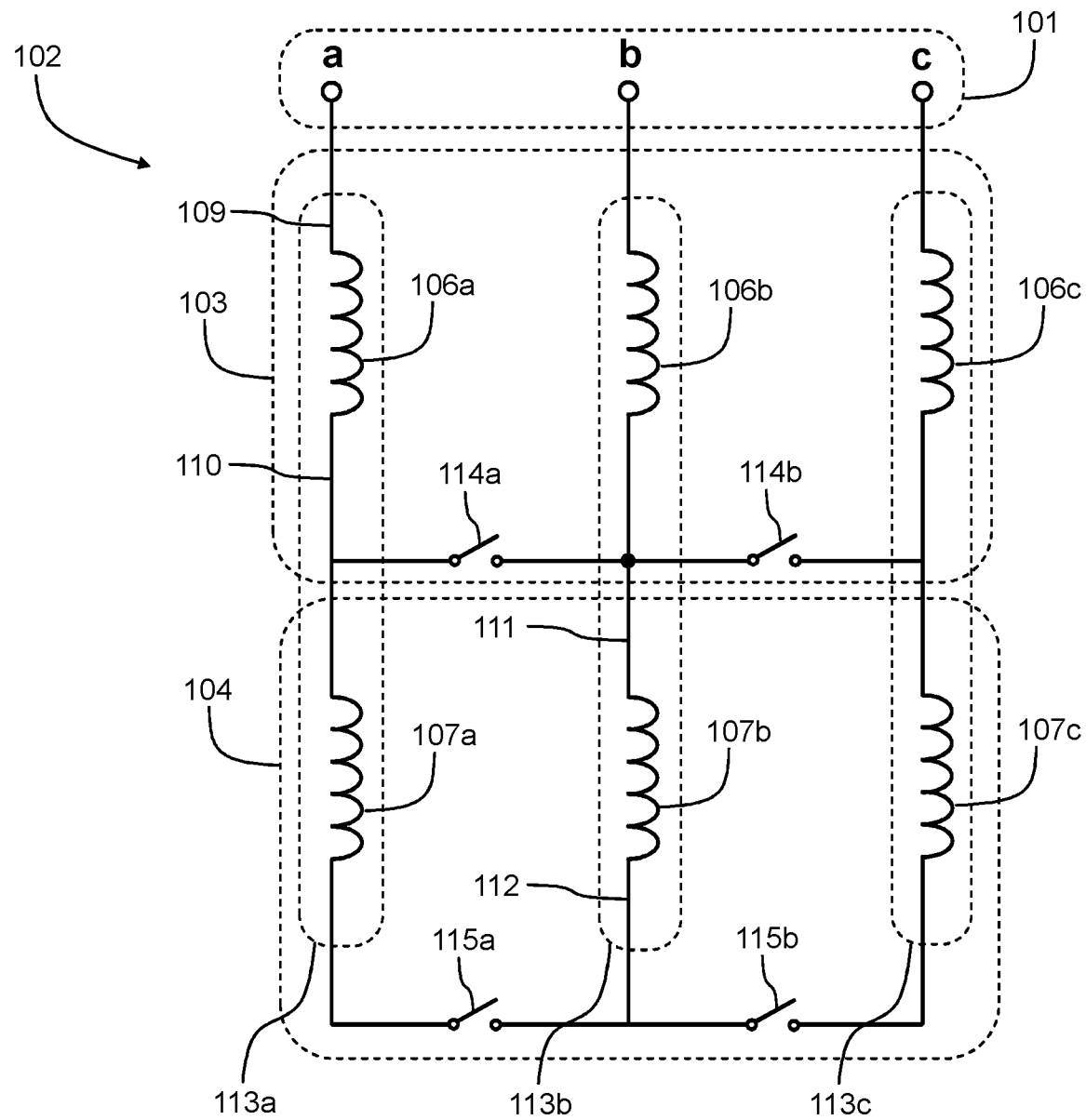
FIG. 1a shows a circuit diagram of a multiphase winding of an electric machine element according to an exemplifying and non-limiting embodiment.

FIG. 1a shows a circuit diagram of a multiphase winding 102 of an electric machine element according to an exemplifying and non-limiting embodiment. The electric machine element can be for example a part of a stator of an electric machine or a part of a rotor of an electric machine. The electric machine element comprises electric terminals 101 for connecting to an alternating current "AC" system external to the electric machine element. The AC system can be e.g. a converter such as a frequency converter configured to drive an electric machine comprising the electric machine element. The multiphase winding 102 is connected to the electric terminals 101, and the multiphase winding 102 comprises two multiphase winding portions 103 and 104. The multiphase winding portion 103 comprises phase-windings 106a, 106b, and 106c, and the multiphase winding portion 104 comprises phase-windings 107a, 107b, and 107c. Each of the phase-windings has a first end and a second end. In FIG. 1a, the first ends of the phase-windings 106a and 107b are denoted with references 109 and 111, respectively. The second ends of the phase-windings 106a and 107b are denoted with references 110 and 112, respectively. The multiphase winding portions 103 and 104 are successively connected to each other so that each phase of the multiphase winding 102 is a chain of the phase-windings belonging to the phase under consideration so that an electric current path from the second end of each phase-winding belonging to the phase under consideration to one of the electric terminals belonging to the phase under consideration comprises at least the phase-winding under consideration. In FIG. 1a, the chain of the phase-windings belonging to phase a is denoted with a reference 113a, the chain of the phase-windings belonging to phase b is denoted with a reference 113b, and the chain of the phase-windings belonging to phase c is denoted with a reference 113c.

The multiphase winding portion 103 comprises switches 114a and 114b for connecting the second ends of the phase-windings 106a, 106b, and 106c to each other to form a star-point at the second ends of the phase-windings 106a, 106b, and 106c. Correspondingly, the multiphase winding portion 104 comprises switches 115a and 115b for connecting the second ends of the phase-windings 107a, 107b, and 107c to each other to form a star-point at the second ends of the phase-windings 107a, 107b, and 107c. The number of turns of the multiphase winding 102 is changeable by selecting which one of the multiphase winding portions 103 and 104 has a star-point at the second ends of its phase-windings. As shown in FIG. 1a, the switches of each multiphase winding portion are connected between the second ends of the phase-windings of the multiphase winding portion under consideration so that the number of switches in each multiphase winding portion is one less than the number of the phases of the multiphase winding 102. In this exemplifying case, the number of switches in each multiphase winding portion is two and the number of the phases of the multiphase winding 102 is three. Each of the above-mentioned switches can be for example an electromechanical switch or an electronic semiconductor switch. An electromechanical switch may comprise e.g. a relay contactor, and an electronic semiconductor switch may comprise e.g. antiparallel connected gate-turn-off "GTO" thyristors.

In an electric machine element according to an exemplifying and non-limiting embodiment, the phase-windings of both the multiphase winding portions 103 and 104 have a same number of turns.

In an electric machine element according to an exemplifying and non-limiting embodiment, the number of turns of each phase-winding of a first one of the multiphase winding portions 103 and 104 is smaller than the number of turns of each phase-winding of the second one of the multiphase winding portions. The first one of the multiphase winding portions can be e.g. the multiphase winding portion 103, in which case the second one of the multiphase winding portions is the multiphase winding portion 104. The number of turns of each phase-winding of the multiphase winding portion 104 can be e.g. at least two or three times the number of turns of each phase-winding of the multiphase winding portion 103.

Figure 1B:
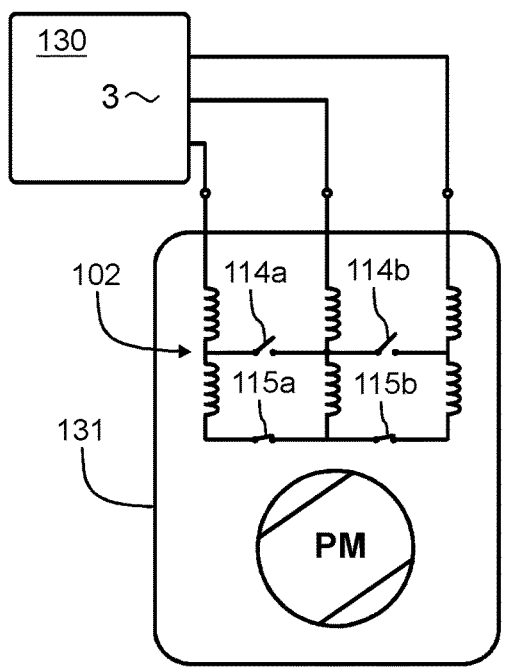
FIGS. 1b and 1c illustrate operation of a permanent magnet machine comprising a multiphase winding illustrated in FIG. 1a, FIG. 1d illustrates electric conductors located in a slot of a core structure of an electric machine element according to an exemplifying and non-limiting embodiment.
Figure 1B:
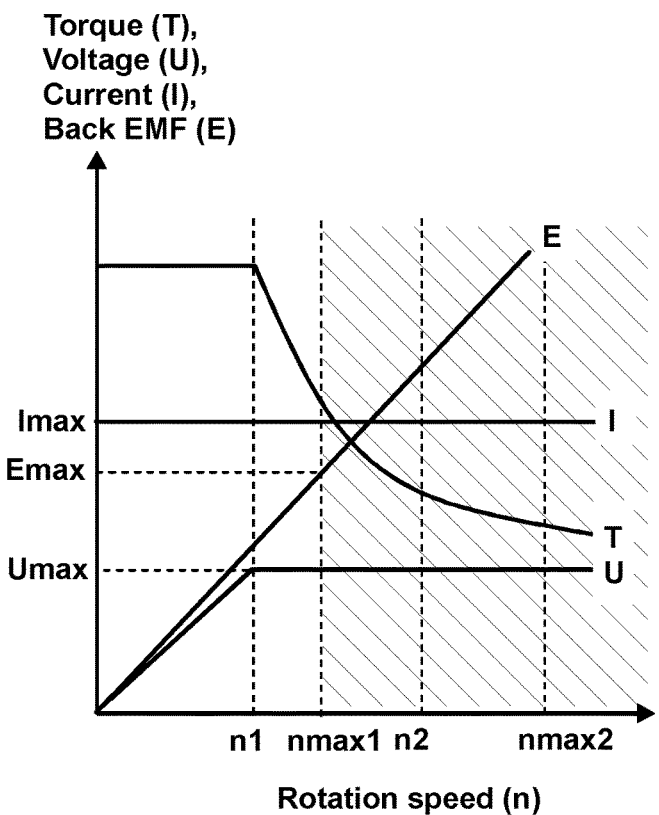
Figure 1C:
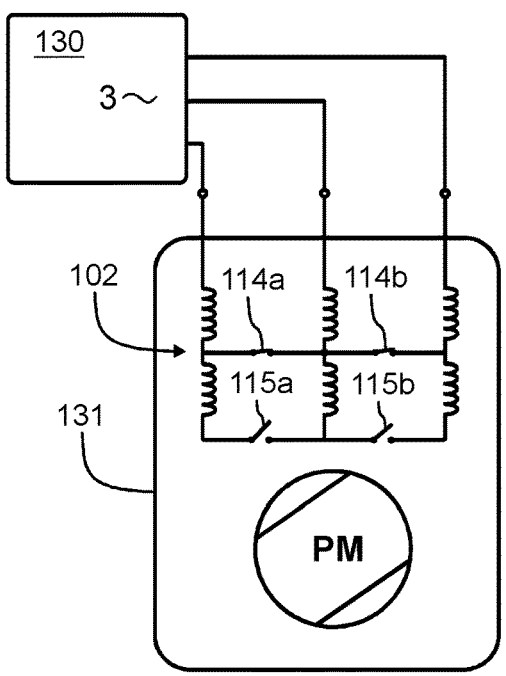
Figure 1C:
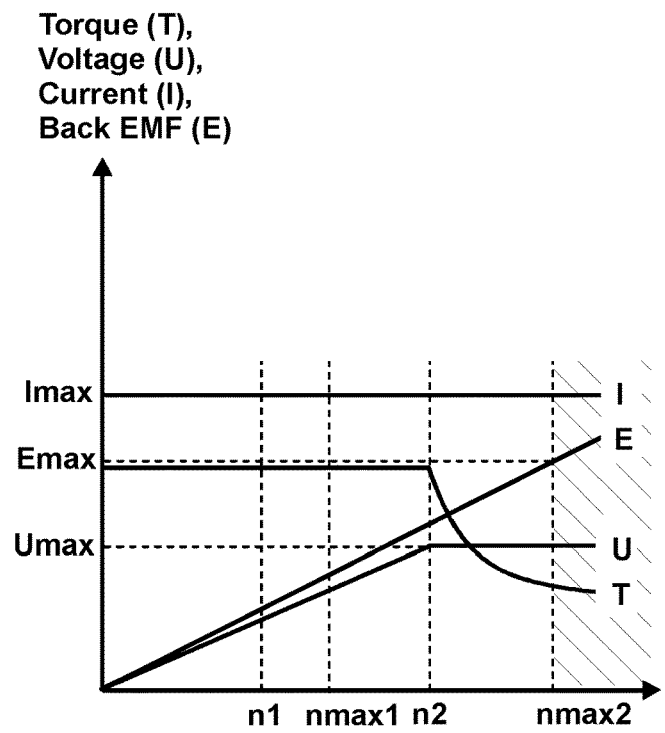

FIGS. 1b and 1c illustrate operation of a permanent magnet machine 131 that comprises the multiphase winding 102 illustrated in FIG. 1a. In the exemplifying case illustrated in FIGS. 1b and 1c, it is assumed that the phase-windings of both the multiphase winding portions 103 and 104 have a substantially same number of turns. In the exemplifying situation shown in FIG. 1b, the switches 114a and 114b are in a non-conductive state and the switches 115a and 115b are in a conductive state. In the exemplifying situation shown in FIG. 1c, the switches 114a and 114b are in the conductive state and the switches 115a and 115b are in the non-conductive state. In the exemplifying case illustrated in FIGS. 1b and 1c, it is assumed that the maximum root-mean-square "RMS" stator current I that can be supplied by an alternating current "AC" system 130 is Imax and the maximum RMS stator voltage U that can be supplied by the AC system 130 is Umax. Furthermore, it is assumed that the permanent magnet machine 131 is cooled so effectively that the AC system 130 is the limiting factor in both the exemplifying situations shown in FIGS. 1b and 1c. Furthermore, it is assumed that the maximum allowable back EMF of the permanent magnet machine 131 is Emax. FIGS. 1a and 1b show the torque T and the back EMF E as functions of the rotation speed n when the RMS stator current is Imax and the RMS stator voltage U first increases linearly up to Umax and thereafter the RMS stator voltage U is Umax. The non-allowed speed area where the back EMF would exceed the maximum allowable back EMF is depicted with a diagonal hatching. As illustrated by FIGS. 1a and 1b, the permanent magnet machine 131 is advantageously in the state shown in FIG. 1b when the rotational speed n is below $n_{max1}$ because less stator current is needed for producing a required torque. When the rotational speed n is within the range from $n_{max1}$ to $n_{max2}$, the permanent magnet machine 131 is advantageously in the state shown in FIG. 1c because otherwise the back EMF would exceed the maximum allowable back EMF Emax.

Figure 1D:
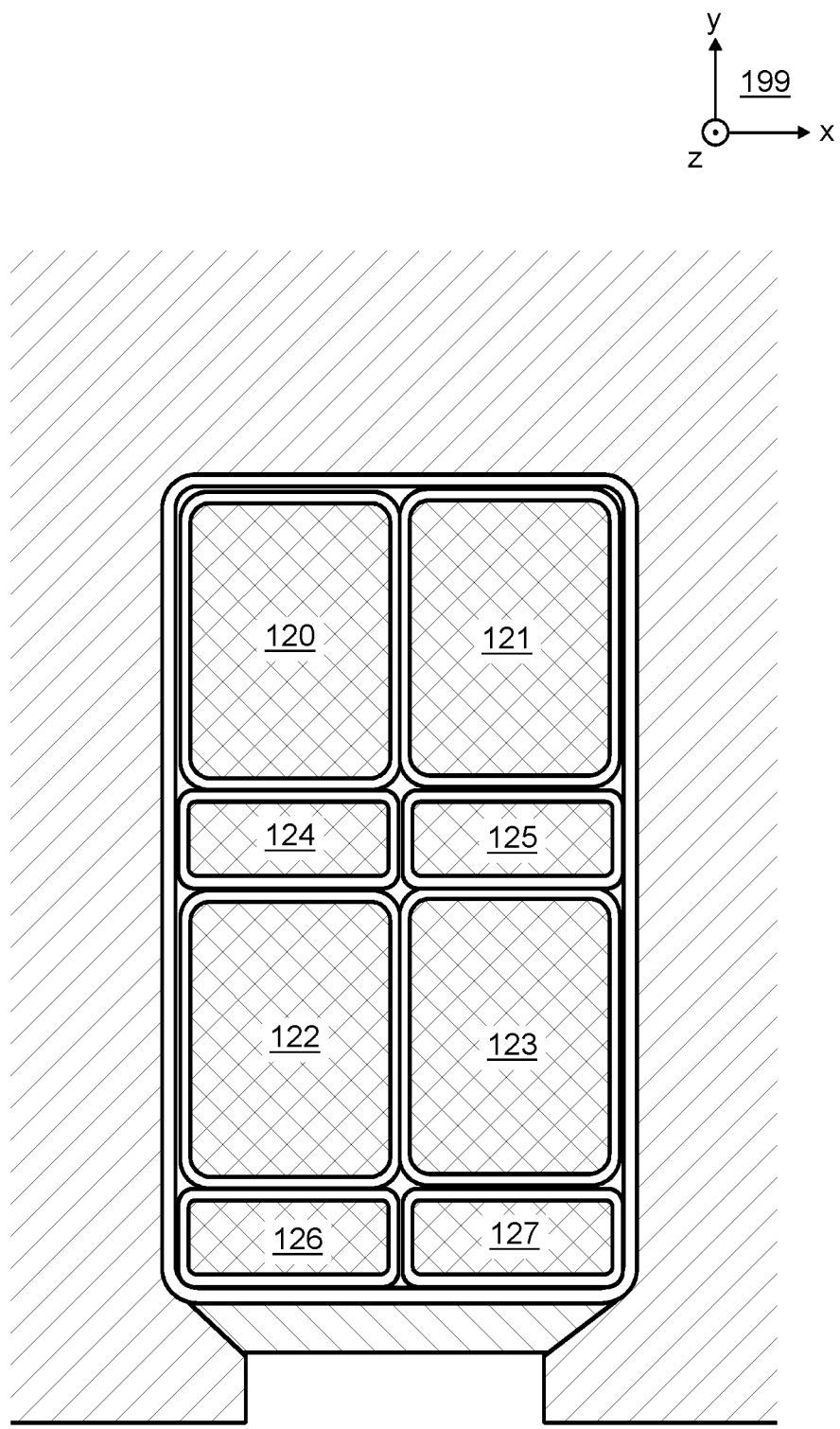

FIG. 1d illustrates electric conductors located in a slot of a core structure of an electric machine element according to an exemplifying and non-limiting embodiment. In this exemplifying case, the multiphase winding of the electric machine element is such as illustrated in FIG. 1a. Electric conductors 120, 121, 122, and 123 represent series connected turns of one of the phase windings of the multiphase winding portion 103, and electric conductors 124, 125, 126, and 127 represent series connected turns of one of the phase windings of the multiphase winding portion 104. Each of the electric conductors 120-127 can be a single bar of electrically conductive material, e.g. copper, or a bundle of many parallel connected wires of electrically conductive material.

The cross-sectional area A of the slot can be shared between the multiphase winding portions 103 and 104 for example so that i) resistive losses in the slot are same in both the situations shown in FIGS. 1b and 1c when ii) total current in the slot is same in both the situations shown in FIGS. 1b and 1c.

The resistance of the series connected electric conductors 120-123 is:

$$R_1 = NL/((A_1/N)\sigma f), \quad (1)$$

where L is the axial length of the slot i.e. the length in the z-direction of a coordinate system 199, $A_1$ is the cross-sectional area occupied by the series connected electric conductors 120-123, σ is the electric conductivity of the electrically conductive material, f is the filling factor of the electrically conductive material on the cross-sectional area A of the slot, and N is the number of the series connected electric conductors 120-123 in the slot. In this exemplifying case N=4.

Correspondingly, the resistance of the series connected electric conductors 124-127 is $$R_2 = NL/((A_2/N)\sigma f), \quad (2)$$

where $A_2$ is the cross-sectional area occupied by the series connected electric conductors 124-127. For the sake of simplicity, the number of the series connected electric conductors 124-127 in the slot is the same as the number N of the series connected electric conductors 120-123 in the slot.

In the situation shown in FIG. 1b, only the series connected electric conductors 120-123 carry current. In the situation shown in FIG. 1c, all the series connected electric conductors 120-127 carry current. Therefore, the total current in the slot is same in both the situations shown in FIGS. 1b and 1c if:

$$NI_1 = 2NI_2, \quad (3)$$

where $I_1$ is the stator current in the situation shown in FIG. 1b and $I_2$ is the stator current in the situation shown in FIG. 1c. The resistive losses in the slot are same in both the situations shown in FIGS. 1b and 1c if:

$$I_1^2 R_1 = I_2^2 (R_1 + R_2), \quad (4)$$

where $R_1+R_2$ is the resistance of all the series connected electric conductors 120-127. Substituting equations 1-3 into equation 4 gives:

$$4/A_1 = 1/A_1 + 1/A_2 = (A_1 + A_2)/(A_1 A_2) = A/(A_1 A_2), \quad (5)$$

which gives $A_2 = A/4$ and $A_1 = 3A/4$. Thus, in this exemplifying case, 75% of the cross-sectional area A of the slot is allocated to the multiphase winding portion 103 and 25% of the cross-sectional area A of the slot is allocated to the multiphase winding portion 104. Therefore, in this exemplifying case, the cross-sectional conductor area of each turn of the phase-windings of the multiphase winding portion 103 is three times the cross-sectional conductor area of each turn of the phase-windings of the multiphase winding portion 104. It is also possible to use different cross-sectional conductor area ratios depending on factors such as for example performance requirements related to the situations shown in FIGS. 1b and 1c and/or a ratio between the numbers of coil turns related to different ones of the multiphase winding portions.

Figure 2:
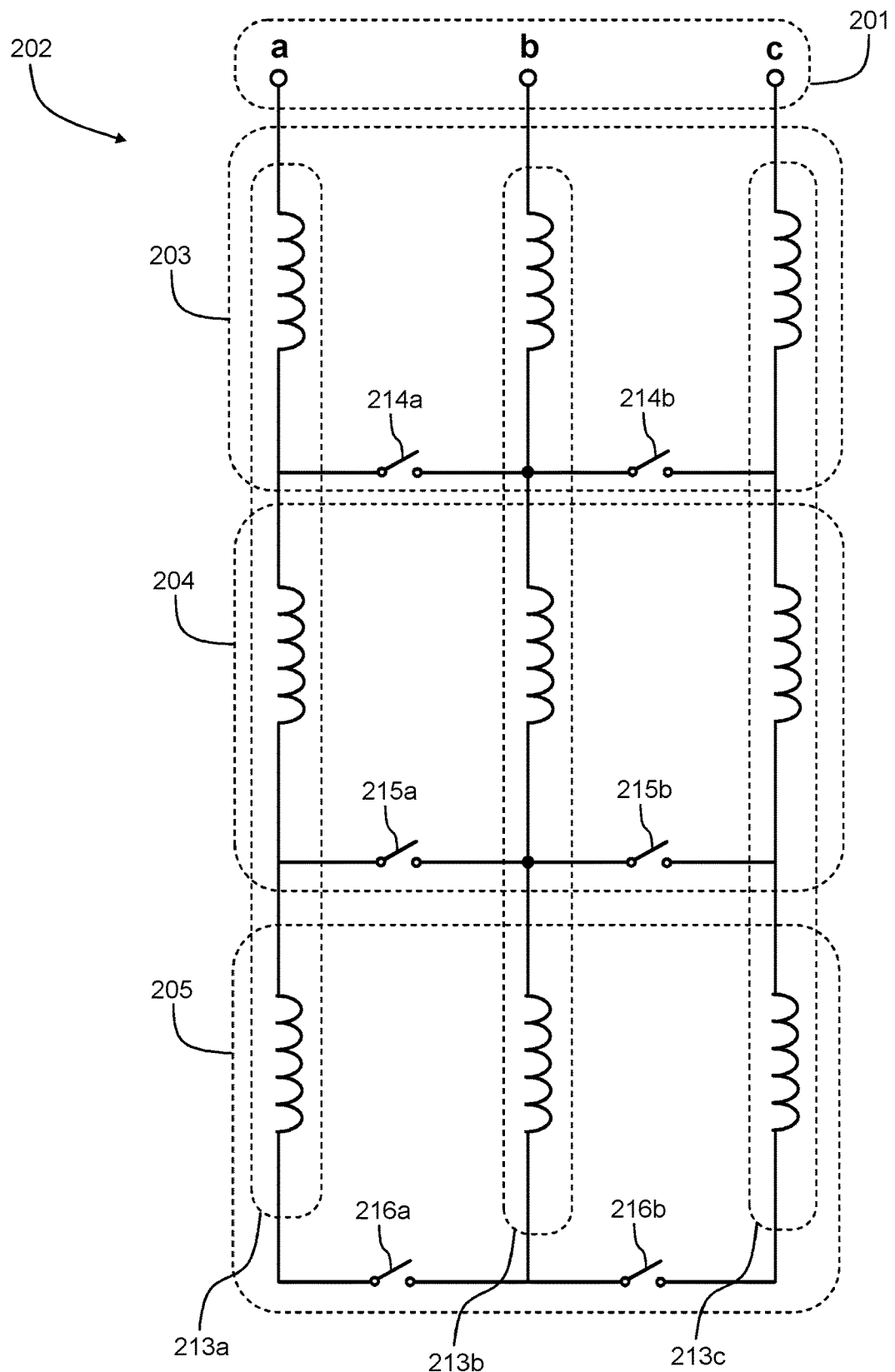
FIG. 2 shows a circuit diagram of a multiphase winding of an electric machine element according to an exemplifying and non-limiting embodiment.

FIG. 2 shows a circuit diagram of a multiphase winding 202 of an electric machine element according to an exemplifying and non-limiting embodiment. The electric machine element comprises electric terminals 201 for connecting to an alternating current system external to the electric machine element. The multiphase winding 202 is connected to the electric terminals 201 and comprises three multiphase winding portions 203, 204, and 205. Each of the multiphase winding portions 203-205 comprises three phase-windings, and each of the phase-windings has a first end and a second end. The multiphase winding portions 203-205 are successively connected to each other so that each phase of the multiphase winding is a chain of the phase-windings belonging to the phase under consideration so that an electric current path from the second end of each phase-winding belonging to the phase under consideration to one of the electric terminals belonging to the phase under consideration comprises at least the phase-winding under consideration. In FIG. 2, the chain of the phase-windings belonging to phase a is denoted with a reference 213a, the chain of the phase-windings belonging to phase b is denoted with a reference 213b, and the chain of the phase-windings belonging to phase c is denoted with a reference 213c.

The multiphase winding 202 comprises switches 214a and 214b for connecting the second ends of the phase-windings of the multiphase winding portion 203 to each other, switches 215a and 215b for connecting the second ends of the phase-windings of the multiphase winding portion 204 to each other, and switches 216a and 216b for connecting the second ends of the phase-windings of the multiphase winding portion 205 to each other. The number of turns of the multiphase winding 202 is changeable by selecting which one of the multiphase winding portions 203-205 has a star-point at the second ends of its phase-windings.

Figure 3:
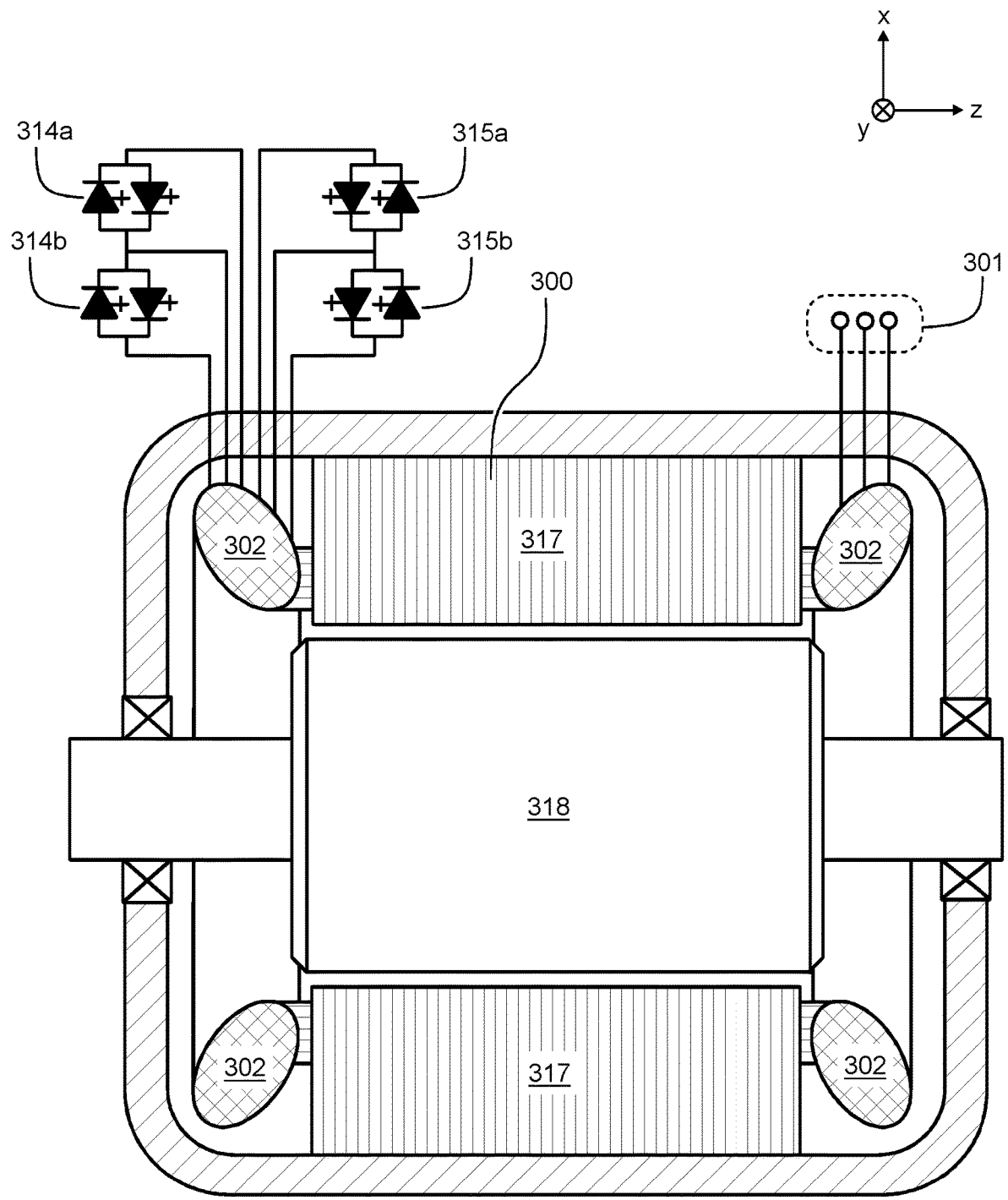
FIG. 3 illustrates an electric machine according to an exemplifying and non-limiting embodiment.

FIG. 3 shows a partial section view of an electric machine according to an exemplifying and non-limiting embodiment. The electric machine comprises a first machine element 300 according to an exemplifying and non-limiting embodiment. The electric machine comprises a second machine element 318 that is rotatably supported with respect to the first machine element 300. In this exemplifying case, the machine element 300 is a part of the stator of the electric machine and the machine element 318 is the rotor of the electric machine. The first machine element 300 comprises a multiphase winding 302 that can be for example such as illustrated in FIG. 1a. The first machine element 300 comprises switches 314a, 314b, 315a, and 315b for selecting which one of multiphase winding portions of the multiphase winding 302 has a star-point at ends of its phase-windings.

The exemplifying electric machine illustrated in FIG. 3 can be for example a permanent magnet machine where the second machine element 318, i.e. the rotor, comprises permanent magnet material for producing a magnetic flux interacting with the first machine element 300. It is also possible that an electric machine according to an exemplifying and non-limiting embodiment is an induction machine or an electrically excited synchronous machine.

In the exemplifying electric machine illustrated in FIG. 3, a core structure 317 of the electric machine element 300 comprises slots containing the coil sides of the multiphase winding 302. It is also possible that an electric machine element according to an exemplifying and non-limiting embodiment comprises a multiphase winding that is an air-gap winding.

The exemplifying electric machine illustrated in FIG. 3 is an inner rotor radial flux machine. It is also possible that an electric machine element according to an exemplifying and non-limiting embodiment is a part of an axial flux machine or a part of an outer rotor radial flux machine.

The specific examples provided in the description given above should not be construed as limiting the applicability and/or interpretation of the appended claims. It is to be noted that lists and groups of examples given in this document are non-exhaustive lists and groups unless otherwise explicitly stated.

What is claimed is:

1. An electric machine element comprising:
   electric terminals for connecting to an alternating current system external to the electric machine element, and
   at least one multiphase winding connected to the electric terminals and comprising at least two multiphase winding portions each comprising phase-windings each having a first end and a second end
   wherein the multiphase winding portions are successively connected to each other so that each phase of the multiphase winding is a chain of the phase-windings belonging to the phase under consideration so that an electric current path from the second end of each phase-winding belonging to the phase under consideration to one of the electric terminals belonging to the phase under consideration comprises at least the phase-winding under consideration, wherein each of the multiphase winding portions comprises switches for connecting the second ends of the phase-windings of the multiphase winding portion under consideration to each other, wherein a cross-sectional conductor area of each turn of the phase-windings of a first one of the multiphase winding portions is greater than a cross-sectional conductor area of each turn of the phase-windings of a second one of the multiphase winding portions, and wherein the first one of the multiphase winding portions is between the electric terminals and the second one of the multiphase winding portions.

2. The electric machine element according to claim 1, wherein the switches of each multiphase winding portion are connected between the second ends of the phase-windings of the multiphase winding portion under consideration so that a number of the switches of the multiphase winding portion under consideration is one less than a number of the phases of the multiphase winding.

3. The electric machine element according to claim 2, wherein a cross-sectional conductor area of each turn of the phase-windings of a first one of the multiphase winding portions is greater than a cross-sectional conductor area of each turn of the phase-windings of a second one of the multiphase winding portions.

4. The electric machine element according to claim 2, wherein the phase-windings of all the multiphase winding portions have a same number of turns.

5. The electric machine element according to claim 2, wherein a number of turns of each phase-winding of a first one of the multiphase winding portions is smaller than a number of turns of each phase-winding of a second one of the multiphase winding portions.

6. The electric machine element according to claim 1, wherein the phase-windings of all the multiphase winding portions have a same number of turns.

7. The electric machine element according to claim 1, wherein a number of turns of each phase-winding of a first one of the multiphase winding portions is smaller than a number of turns of each phase-winding of a second one of the multiphase winding portions.

8. The electric machine element according to claim 7, wherein the number of turns of each phase-winding of the second one of the multiphase winding portions is at least two times the number of turns of each phase-winding of the first one of the multiphase winding portions.

9. The electric machine element according to claim 8, wherein the number of turns of each phase-winding of the second one of the multiphase winding portions is at least three times the number of turns of each phase-winding of the first one of the multiphase winding portions.

10. The electric machine element according to claim 7, wherein the first one of the multiphase winding portions is between the electric terminals and the second one of the multiphase winding portions.

11. The electric machine element according to claim 1, wherein a core structure of the electric machine element comprises slots containing the phase-windings of the multiphase winding portions.

12. The electric machine element according to claim 1, wherein the electric machine element is a part of a stator of an alternating current electric machine.

13. The electric machine element according to claim 1, wherein the electric machine element is a part of a stator of an inner rotor alternating current electric machine.

14. An electric machine comprising first and second machine elements rotatably supported with respect to each other, the first machine element being an electric machine element according to claim 1.

15. The electric machine according to claim 14, wherein the second machine element comprises permanent magnet material for producing a magnetic flux interacting with the first machine element.

16. The electric machine according to claim 14, wherein the first machine element is a part of a stator of the electric machine and the second machine element is a rotor of the electric machine.

* * * * *